(12) United States Patent
Baird et al.

(10) Patent No.: US 6,469,636 B1
(45) Date of Patent: Oct. 22, 2002

(54) HIGH-POWER WELL LOGGING METHOD AND APPARATUS

(75) Inventors: Gary K. Baird, Richmond, TX (US);
Carl Dodge, Houston, TX (US);
Thomas E. Henderson, Katy, TX (US);
Francisco Velasquez, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/437,594

(22) Filed: Nov. 10, 1999

Related U.S. Application Data
(60) Provisional application No. 60/110,560, filed on Dec. 2, 1998, and provisional application No. 60/153,163, filed on Sep. 9, 1999.

(51) Int. Cl.[7] .............................................. G01V 3/00
(52) U.S. Cl. .............................. 340/854.9; 340/853.1; 166/66; 333/17.2; 333/243
(58) Field of Search .......................... 340/853.7, 853.1, 340/854.9, 854.7, 855.2; 166/66; 250/253, 263; 333/17.2, 243; 324/539

(56) References Cited

U.S. PATENT DOCUMENTS

| | | | |
|---|---|---|---|
| 4,399,400 A | 8/1983 | Rockwell et al. | 324/51 |
| 4,523,804 A | 6/1985 | Thompson | 350/96.23 |
| 4,578,645 A | 3/1986 | Hoehn, Jr. | 324/338 |
| 4,583,093 A | 4/1986 | Beals | 340/857 |
| 4,723,054 A | 2/1988 | Billet | 174/74 R |
| 4,841,259 A | 6/1989 | Mayer | 333/17.2 |
| 4,891,641 A | 1/1990 | Gard et al. | 340/857 |
| 5,140,318 A | 8/1992 | Stiner | 340/854.8 |
| 5,483,232 A | 1/1996 | Clark, Jr. et al. | 340/853.1 |
| 5,495,547 A | 2/1996 | Rafie et al. | 385/101 |
| 5,504,479 A | 4/1996 | Doyle et al. | 340/854.9 |

*Primary Examiner*—Michael Horabik
*Assistant Examiner*—Albert K. Wong
(74) *Attorney, Agent, or Firm*—Conley, Rose & Tayon, P.C.

(57) ABSTRACT

A system and method is described for safely and economically providing up to 1800 watts to downhole equipment over existing logging cables. In one embodiment, the system includes a standard multiconductor logging cable which supports orthogonal signal transmission modes on circumferentially spaced insulated conductors. A high-power power source on the surface is coupled to the insulated conductors in the cable to drive a power signal on the lowest impedance signal transmission mode. Bearing in mind that high-power electrical currents can present a safety hazard, system safety may be enhanced by the addition of a reliable current imbalance detector configured to shut down all power sources when currents in the insulated conductors don't add up to zero. The system may further include multiple power sources operating on different independent signal transmission modes, and may also include multiple telemetry channels which share the power transmission modes via frequency multiplexing. The system may also deliver computer-regulated downhole power voltages, and the computer may be further configured to customize signal waveforms and power allocation on the various independent signal transmission modes to maximize the power capacity of the logging cable subject to its maximum voltage rating.

10 Claims, 7 Drawing Sheets

HIGH-POWER WELL LOGGING METHOD AND APPARATUS

"This application is a continuation of provisional application No. 60/110,560 filed Dec. 2, 1998 and provisional application No. 60/153,163 filed Sep. 9, 1999."

BACKGROUND OF THE INVENTION

This invention relates to the field of well logging methods and apparatus for determining the characteristics of the earth formations surrounding a bore hole, and more particularly, to a wireline logging cable for safely providing large amounts of electrical power downhole to the well logging tool and for transmitting signals between the surface and the instruments in the well logging tool.

It is often necessary to survey or "log" the formations surrounding the borehole by passing a logging sonde or well logging tool through the borehole to measure the parameters or characteristics of the formations at various depths within the borehole. The logging tool is passed through the borehole using a wireline cable which supplies electrical power to the logging tool and transmits telemetry signals between the surface and the logging tool. The logging tool collects data and other information as it passes through the borehole and transmits the data and information to the surface for further processing and analysis.

One type of well logging tool includes a radioactive source housed within the moving tool which emits radiations, such as neutrons or gamma rays, which pass into the formation surrounding the borehole. A portion of the emitted radiation reacts with the formation to produce radiation that is scattered back to the logging tool. The characteristics of this radiation then are transmitted to the surface for identifying the surrounding formation such as oil production zones.

This type of tool typically includes a radioactive source, thereby raising environmental and safety issues. Consequently this tool type is gradually being supplanted by other high-resolution techniques such as Magnetic Resonance Image Logging (MRIL) which do not require the use of radioactive materials. These tools emit high-intensity electromagnetic pulses and measure the relaxation times of atomic nuclei to determine the molecular makeup of the formation surrounding the borehole. MRIL tools generally require more electrical power than the tools employing radioactive-sources.

Another tool which is gradually growing in popularity is called a Reservoir Description Tool (RDT). In uncased boreholes, high-pressure drilling muds are used to prevent the collapse of the borehole walls, and the muds tend to seep into porous formations, making it difficult to measure characteristics of any other fluids present in the formation. The RDT provides a pump to decrease the mud pressure and encourage fluid flow from the formation, and also provides sample chambers to retrieve samples of the formation fluid. The RDT pump motor needs up to 1.8 kW of power to operate properly. The RDT may also be provided with sensing instruments that require a stable power supply and a bi-directional communications channel for telemetry data.

Typically these or other standard well logging tools are passed through oil based well fluids filling the borehole. Many countries are now requiring that for subsea wells the conventional oil-based well fluids be replaced with a salt saturated mud which have a less negative impact on the surrounding environment (e.g. the salt saturated muds will avoid a sheen on the water's surface). The increased conductivity of these muds shields the formation from many logging instruments, and increased power is required to pass signals from the instrumentation in the well logging tool through these well fluids. Prior methods for supplying downhole power may be inadequate for the increased power demands of "high power logging".

One popular standard multiconductor wireline cable comprises six insulated conductors wrapped around a seventh, central insulated conductor. This assembly is encased within two counter-wound layers of steel armor wires which protect the interior conductors and carry the weight of the cable and sonde. A typical series resistance for the insulated conductors is about 10 ohms per thousand feet, or about 300 ohms for a 30,000 foot cable. However, this resistance may be significantly increased due to the higher temperatures which exist in the borehole.

In an effort to minimize the power losses due to resistance in the insulated conductors, conventional high power systems combine four of the conductors in parallel to carry current downhole, and use the armor as a return path. Since the resistance of the armor is about a tenth that of the conductors, or about 30 ohms for a 30,000 foot cable, this results in an overall impedance of about 105 ohms. However, it is expected that with the high power requirements, the armor would often sustain a voltage drop of 130 volts or more, causing a safety hazard. Power delivered in such a manner exposes the workers operating the surface equipment to electrical shock. Additionally, there is a risk of accidents due to electrical arcing downhole, possibly igniting gas.

The present invention overcomes the deficiencies of the prior art.

SUMMARY OF THE INVENTION

A system and method is described for safely and economically providing up to 1800 watts to downhole equipment over existing logging cables. If necessary, the power can be further increased by moving to logging cables with lower series electrical resistance. In one embodiment, the system includes a standard multiconductor logging cable which supports orthogonal signal transmission modes on equidistant, circumferentially spaced insulated conductors. The conductors carrying power current are safely enclosed within the logging cable's armor. A high-power power source on the surface is coupled to the insulated conductors in the cable to drive a power signal on the lowest impedance signal transmission mode (mode M6 for a seven conductor logging cable). Bearing in mind that high-power electrical currents can present a safety hazard, system safety may be enhanced by the addition of a current imbalance detector configured to shut down the high-power power source when currents in the insulated conductors don't add up to zero. The system may further include multiple power sources operating on different independent signal transmission modes, and may also include multiple telemetry channels which share the power transmission modes via frequency multiplexing.

In another embodiment, the system includes a standard multiconductor logging cable, a downhole toolstring, a programmable power supply, a telemetry receiver, and a computer. The toolstring is powered by a power signal carried on the cable from the programmable power supply. A downhole voltage detector measures the received power signal voltage, and responsively transmits a telemetry signal via the cable to the surface. At the surface, the telemetry receiver converts the telemetry signal into a voltage measurement for the computer. The computer is configured to control the power supply to regulate the received voltage. The system may be provided with multiple power supplies, in which case the computer is configured to analyze the power requirements of the toolstring and to accordingly customize the distribution of power among the independent transmission modes. The computer operates to maximize the power carried by the cable subject to the limitation imposed by the electrical breakdown voltage of the cable. The customization of power distribution may employ, among other things, shifting of signal phases and modification of waveforms.

BRIEF DESCRIPTION OF THE DRAWINGS

For a detailed description of the preferred embodiment of the invention, reference will now be made to the accompanying drawings wherein.

DESCRIPTION OF PREFERRED EMBODIMENTS

Figure 1:
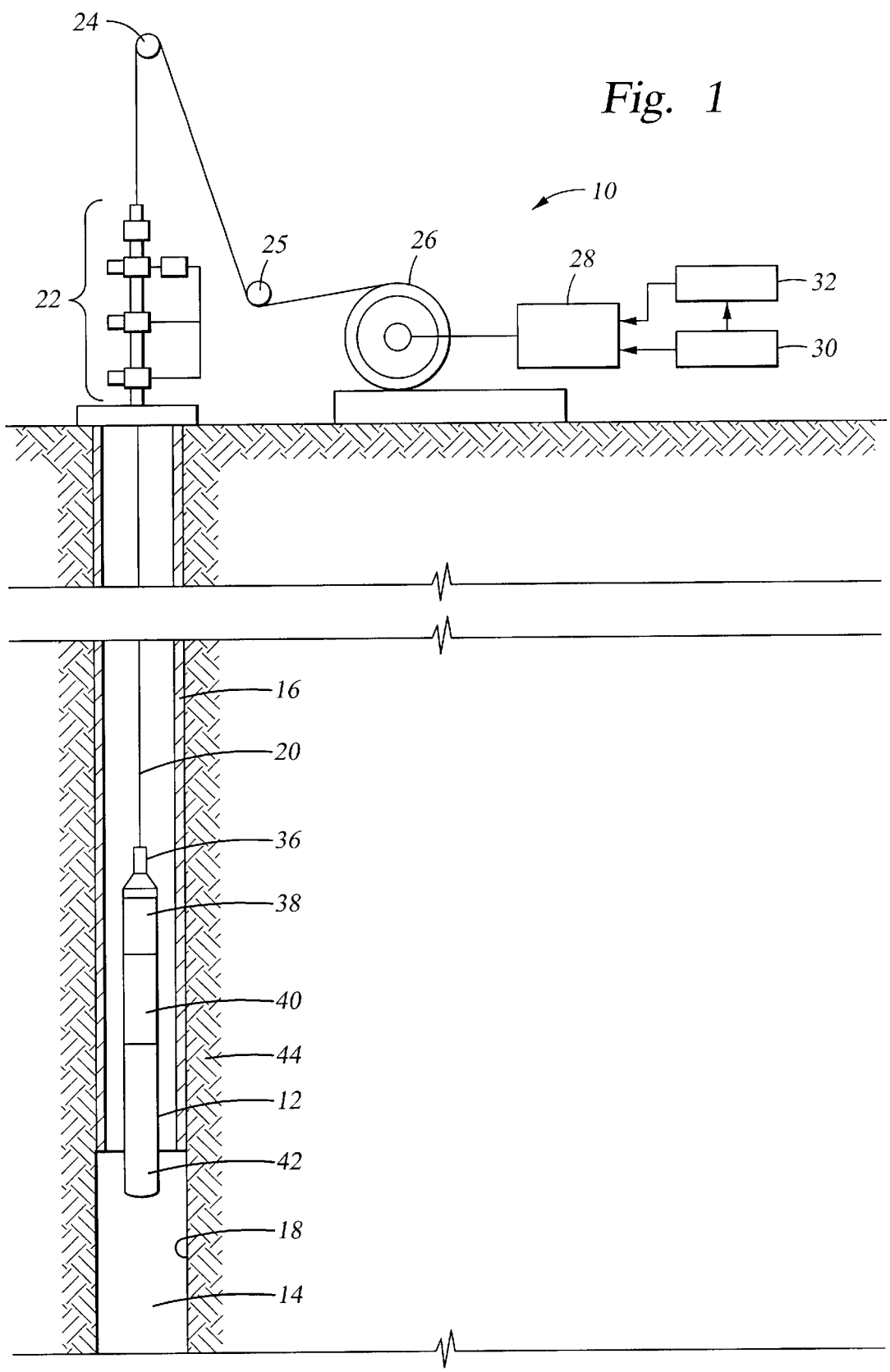
FIG. 1 is a block diagram of a well logging system using the present invention.

Referring initially to FIG. 1, the well logging system 10 of the present invention includes a well logging tool 12 to be lowered into a borehole 14 suspended on a cable 20. The borehole 14 may be cased with concentric casing 16 or be an open borehole such as at 18. The cable 20 extends from the tool 12 up through wellhead 22 and around a first sheave 24 and a second sheave 25 to a rotatable spool 26 for raising and lowering the cable 20 and tool 12.

The conductors in cable 20 are typically connected to a transceiver 28. In an exemplary embodiment, the conductors in cable 20 are each connected to a corresponding electrically conductive slip ring (not shown) on the spool axle. The conductive slip rings transfer electrical currents from the cable that rotates with the spool to corresponding electrically conductive brushes "riding" on the slip rings. The brushes are then coupled to the transceiver 28. In this manner, signals are transferred from the rotating spool to the stationary transceiver 28 with negligible degradation.

The transceiver 28 receives the logging data and information and in turn transmits the data and information to a computer or microprocessor 30. The computer 30 analyzes the logging data received from the downhole tool 12 and typically displays the logging information for the operator. The computer 30 may be further configured to provide control signals to transceiver 28 for communication to well logging tool 12. The cable 20 is also connected via transceiver 28 to a power supply 32 for supplying power to the logging tool 12. In a preferred embodiment, the power supply 32 is a programmable switching power supply capable of producing adjustable voltages and waveforms under the control of computer 30.

In well logging system 10, cable 20 is configured to safely deliver high electrical power and bi-directional telemetry to tool 12. The power is delivered in such a way that this system offers maximum safety to people operating the surface equipment, the logging cable, and the tools. Additionally the risk of property loss (such as accidental damage or destruction of drilling equipment) due to electrical arcing is reduced in system 10 during logging operations.

The well logging tool 12 may be any one of various types used for recording downhole data. It should be appreciated that the present invention is not limited to a particular well logging tool. Typically, the well logging tool 12 includes a cable head 36 with the upper portion of the tool 12 including suitable electronic circuitry for controlling the supply of power and the transmission of the signals to and from tool 12. Typically tool 12 includes a motorized unit 40 and an instrument package 42 for collecting the data on the surrounding formation 44.

In typical operation, the well logging tool 12 is passed downwardly through the cased borehole 16 and into the open borehole 18 and then retrieved from the borehole 14 by spooling the cable 20 onto the reel 26. As the well logging tool 12 passes through the borehole 14, information is gathered and collected on the characteristics on the formation 44 surrounding the borehole 14. Reel 26 is normally provided with a rotational electrical connector having stationary brushes for connecting to transceiver 28.

In a preferred embodiment, cable 20 is a seven-conductor logging cable such as that which is obtainable from various companies including Camesa Inc., Cablesa, and the Rochester Corp. Suitable examples include the Rochester 7H464 15/32" diameter cable or the Rochester 7H472 "SLAMMER" cable. Typical electrical characteristics of such cables are shown below.

| | |
|---|---|
| Electrical Insulation resistance | 1500 Megohm/Kft. |
| Rated insulation breakdown voltage | 1100 VDC (1200 VDC for 7H464) |
| Conductor series resistance | 10.5 ohms/Kft. maximum |
| Capacitance (any conductor to armor) | 40 to 50 pf/ft. (depends on temp. rating and the insulating material) |
| Capacitive and series electrical resistance balance between outer 6 conductors | 4% maximum variation |

These cables typically have two layers of contra-helically wound steel armor encasing seven electrical conductors. The geometry of the electrical conductors is six outer conductors wrapped around a seventh central conductor. The six outer conductors are equally spaced circumferentially. The steel armor is conductive (about 1 ohm/1000 ft), and is sometimes used as an eighth electrical conductor. The steel armor is also ferromagnetic, and may be magnetically "marked" at regular intervals as a way of monitoring the downhole position of tool 12.

Other suitable examples of cable 20 include cables with stainless steel armor, MP35 armor, or other armors which have higher armor resistances. These cables may be preferred for corrosive drilling environments (e.g. high $H_2S$ and/or $CO_2$ concentrations).

Cable 20 is typically five or more miles in length, and the electrical conductors are subject to strong capacitive and inductive coupling. As a consequence of this, signals sent downhole along any two arbitrary conductors are subject to distortion, and they produce significant "crosstalk" on the other conductors. One solution to this problem is to use separate cables for each signal, but this is expensive and not very reliable. Another solution to this problem is to use electrical "eigenmodes" in the cable for transmitting signals. By transmitting signals over groupings of conductors having certain symmetries, much of the coupling is cancelled out by the symmetry of the conductor grouping.

Figure 2:
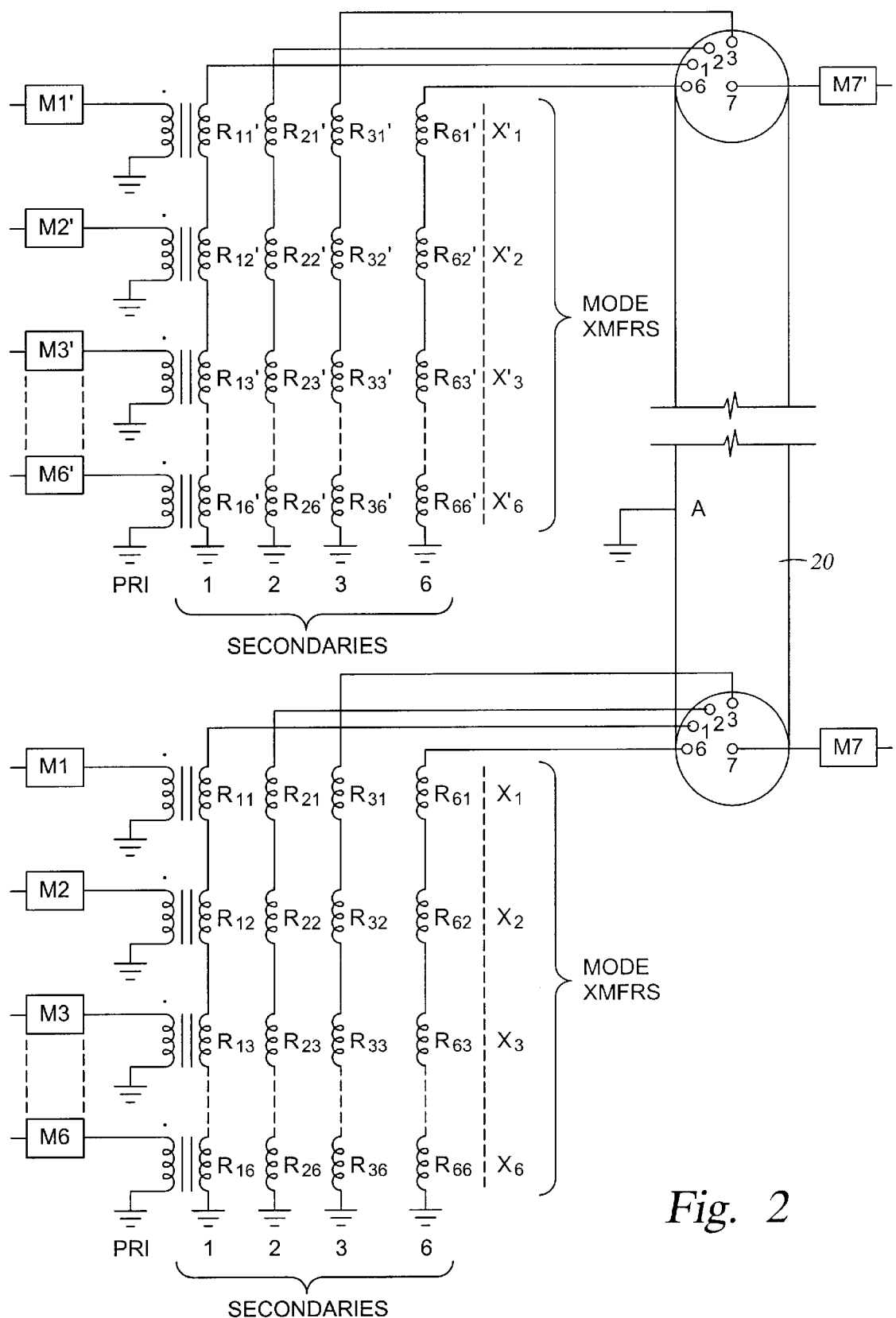
FIG. 2 is a schematic diagram for illustrating one implementation of mode transmission on a logging cable.

Referring now to FIG. 2, a schematic illustration of eigenmodes (hereafter modes) is shown. At one end of cable 20, signal sources/receivers M1, M2, . . . M6 are each coupled to respective mode transformers X1, X2, . . . X6. Corresponding signal sources/receivers M1', M2', . . . M6' are similarly coupled to corresponding mode transformers X1', X2', . . . X6' at the other end of cable 20. Transformer X1 causes any voltage V induced by M1 to be excited on conductors 1 through 6 as $r_{11}V, r_{21}V, r_{31}V, \ldots r_{61}V$, where $r_{ij}$ is the transformer turn ratio of conductor i's coil to the primary coil of transformer X1. It is noted that $r_{ij}$ is negative when conductor i's coil is wound in a direction opposite that of the primary coil.

To prevent the voltage V from being detected by any other transformer except X1', the transformer winding ratios are chosen so that the following equation is satisfied:

$$\sum_{i=1}^{6} r_{ij} r'_{ik} = \begin{cases} 0 & \text{if } j \neq k \\ C & \text{if } j = k, \end{cases}$$

where C is a positive nonzero number. There are many ways to achieve this orthogonal relationship, but the following selection of coefficients is easy to implement, and it takes advantage of symmetries in the cable. It is assumed that the conductors are equidistant from each other and equally distant from the center of the cable. This assumption is valid for the six outer conductors of a seven conductor logging cable.

| conductor # | Mode | | | | | |
|---|---|---|---|---|---|---|
| | M1 | M2 | M3 | M4 | M5 | M6 |
| 1 | +1 | +1 | +1 | +1 | +1 | +1 |
| 2 | +1 | +1 | −1 | +1 | −1 | −1 |
| 3 | +1 | 0 | −2 | −2 | 0 | +1 |
| 4 | +1 | −1 | −1 | +1 | +1 | −1 |
| 5 | +1 | −1 | +1 | +1 | −1 | +1 |
| 6 | +1 | 0 | +2 | −2 | 0 | −1 |

Each of the columns is an eigenvector corresponding to a signal and/or power transmission mode. Each number in the column represents the component of the eigenvector corresponding to a particular cable conductor. The relative values of the components of each eigenvector indicate the ratios of voltages that must be impressed on (or currents that must be induced in) each conductor in order to excite the particular signal or power transmission mode described mathematically by that eigenvector. That these sets of numbers describe orthogonal modes may be determined by taking the inner product of any two eigenvectors (multiplying the components of any one eigenvector by the corresponding components of any other eigenvector and taking the sum of these products). The inner product of two different eigenvectors will equal zero, while the inner product of any eigenvector with itself will be non-zero.

Eigenmode transmission in multiconductor cables is treated by David F. Strawe in the Boeing Co. report number D2-19734-1 "Analysis of Uniform Symmetric Transmission Lines" Jan. 27, 1971, and in Boeing Co. report number D2-26245-1 "Analysis of the controlled-Lay Cable" January 1973. Additional information can be found in "Multiconductor Transmission Line Analysis", by Sidnely Frankel, Artech House Inc., 1977, "Analysis of Multiconductor Transmission Lines (Wiley Series in Microwave and Optical Engineering), Clayton R. Paul, 1994, and in U.S. Pat. 3,603,923 dated Sep. 10, 1968 by Nulligan describing equipment using eigenmode transmission on a multiconductor cable. These references are hereby incorporated by reference.

The seventh conductor (7) may be used in conjunction with the cable armor (A) as an additional signal path. Although this is herein called a seventh mode (A7), this signal path is not orthogonal to (or independent of) mode M1, However, M1 has limited utility since it does not provide a complete transmission path. To transfer power from one end of the cable to the other, mode M1 must be used with another conductor not included in the set of the six outer conductors. The only possible other conductors in a 7-conductor logging cable are the central conductor and the armor.

Because of the physical symmetry of the group of conductors chosen to carry the currents of any particular mode, signals sent on one mode interfere only minimally with signals sent on any other mode. This signal independence is highly desirable. Due to the signal independence, 60 Hz and/or 400 Hz electrical power from the surface to downhole tools and bi-directional telemetry signals between the tools and the surface equipment can be simultaneously sent over the six outer conductors, and cause only minimal interference effects. Even huge transient surges in power due to motors turning on and off are rendered invisible to other modes which could be carrying sensitive telemetry information.

In practice, the degree to which these voltage and current weightings are exactly attained will directly affect the independence of the modes from each other. Mode independence is desirable to minimize signal interference (crosstalk). In order to maintain the selected ratios of voltages (or currents) along the length of the cable, the cable must have conductors that are well balanced. Here, well balanced means that each cable conductor must have the same resistance per unit length, the same capacitance to armor per unit length, and must be made with uniform diameter and lay length over the length of the cable. In other words, the impedance and mutual coupling of the outer six conductors of the cable must be closely matched. Operational amplifiers, capacitors, or transformers are examples of techniques which may be used to impress voltages (or currents) onto the various cable conductors to excite a given mode. Of these, a special type of transformer has been found to be well suited to inducing and extracting signals of the exact weights selected.

Multifilar transformers have identical windings, that is, each winding has the same characteristics, e.g. the same number of turns, the same capacitance with respect to adjacent windings, the same self inductance, the same mutual inductance with respect to adjacent windings, etc. Multifilar transformers with N identical secondary windings may be constructed by twisting N wires together, and then wrapping the twisted wire bundle together around the transformer core. To excite or receive a double voltage in a particular conductor (e.g. for conductors 3 and 6 in modes M3 and M4 ), two of these identical windings may be connected in series. An additional beneficial consequence of multifilar transformer design results from capacitive coupling between wires in the twisted wire bundle. This capacitive coupling offsets the self-inductance of the windings, thereby extending the effective bandwidth of multifilar transformers. For small signals (e.g. communications and telemetry), the bandwidth typically extends into the megahertz range.

The operating principle of transformer design is based on magnetic coupling of current-induced magnetic fields. To operate, transformers excite or detect currents in windings around the transformer core. For currents to flow (to allow transformers to operate) there must be a reasonably low-impedance current path at the frequency of interest. At higher signal frequencies this may necessitate the use of capacitors to close the current loops.

To increase the number of signal channels carried by a logging cable, frequency division multiplexing may be used within each of the modes. For example, modes M2 and M5 could each simultaneously carry power (e.g. 60 Hz, 400 Hz) and telemetry (5–250 kHz) signals. However, nonlinear effects such as magnetic saturation of the transformer core can cause the power signal to corrupt the telemetry signal. One way to prevent this is to use a pair of transformers for each conductor mode coefficient. The first transformer imposes (or extracts) the power signal, and the second transformer imposes (or extracts) the telemetry signal. The second transformer is constructed in such a way to have a poor frequency response at 60 Hz and 400 Hz. Additionally, the second transformer's core has an air gap to significantly increase the signal level required to saturate the core. It is noted that at high frequencies, electrical field coupling between the windings also contributes to the operation of the transformer, so a strong magnetic field coupling is not as crucial. Any extracted telemetry signal can then be further filtered to prevent any residual 60 Hz or 400 Hz power information from distorting the desired signal.

It is noted that the various modes have different frequency responses. Consequently, certain modes may be more suitable for transporting high frequencies than other modes. Modes M4, M5, M6 and A7 are the highest bandwidth modes, and consequently may be chosen as the "best" modes for telemetry. M2 and M3 may be best used for low bandwidth signals.

The various modes also have different impedances. Since transmission loss is a consideration in power transmission, the differing impedances should play a role in determining mode assignments. The relative DC resistance of the six modes is illustrated in the table below. The calculations assume a cable length of 30,000 feet, with each cable conductor having a resistance of 10 ohm/Kft. Mode M1 is not capable of transmission by itself; and must be used either with the central conductor or with armor. Plow steel is the material normally used to make the armor wires. The plow steel armor package typically has a resistance of about 1 ohm/Kft.

| | |
|---|---|
| M1 vs. Armor (A) | 80 ohms |
| M1 vs. Conductor 7(7) | 350 ohms |
| M2 | 300 ohms |
| M3 | 225 ohms |
| M4 | 225 ohms |
| M5 | 300 ohms |
| M6 | 200 ohms |
| A7 | 330 ohms |

Besides bandwidth and impedance, other system considerations (e.g. safety, transformer design) may play a role in selecting mode assignments.

In referring to FIGS. 3–8, regular use of the terms "primary" and "secondary" windings of a transformer will be made. Usually the terms connote the exciting and excited windings, respectively, but one of skill in the art will recognize that these functions are readily interchangeable, e.g. in the case of bi-directional communication. For the sake of clarity, the windings connected to cable conductors will be uniformly referred to as secondaries, even when they are performing the function of exciting other windings. Similarly, the windings not electrically connected to the cable conductors will be uniformly referred to as primaries.

Figure 3:
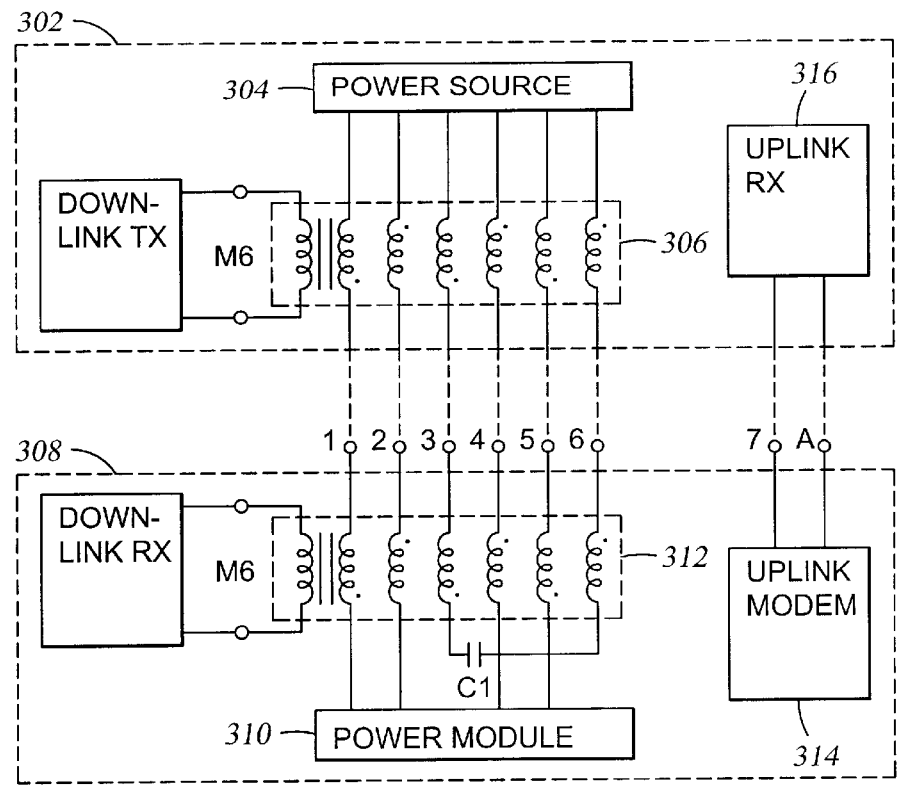
FIG. 3 is a block diagram illustrating the use of mode M6 for telemetry in a conventional system.

In a conventional system, the following mode assignments may be made:

M2—Power for motors (DC, 60 Hz, 400 Hz)
M5—Power for instruments (60 Hz)
M6—Downlink telemetry
A7—Uplink telemetry FIG. 3 shows a schematic of this system. Surface equipment 302 includes a power source 304 and downlink transformer 306 coupled to conductors 1 through 6. The power source 304 supplies power in modes M2 and M5. Downlink transformer 306 converts a downlink telemetry signal applied to the primary winding into mode M6 signals, and adds them to the signals on conductors 1 through 6. Downhole equipment 308 includes a power supply 310 and a downlink transformer 312 coupled to conductors 1 through 6. Downlink transformer 312 converts the mode M6 signals back into the downlink telemetry signal, and the power supply 310 extracts the mode M2 and M5 power signals for use by the tools and instruments. Downhole equipment 308 further includes an uplink transmitter 314 coupled to conductors 7 and A (Armor) for transmitting an uplink telemetry signal via "mode" A7. A corresponding uplink receiver 316 in the surface equipment 302 is coupled to conductors 7 and A to receive the uplink telemetry signal.

Historically downlink telemetry (control signals sent to the tool from the surface equipment) has used mode M6. However, it is desirable to reserve mode M6 for high-power power transmission because the impedance of this mode is the lowest of all of the modes that do not use armor as part of the transmission path. Eliminating large currents through the armor substantially reduces the risk of electrical shock to people coming into contact with the armor. In addition to reducing transmission losses, using the lowest available mode impedance minimizes the necessary surface voltage on individual conductors. This is significant because the rated insulation breakdown voltage of the cable becomes the limiting factor to supplying large powers safely to downhole tools.

Of course, designers are not limited to using modes when transmitting signals downhole. In one system, conductors 1, 2, 4, and 5 are driven in parallel and the armor is used as a high-power current return. This reduces the DC resistance to 105 ohms, but still creates a safety hazard. Further this system requires the use of plow steel armor, an infeasible option in corrosive wellbore conditions.

Any logging cable power delivery system that uses armor as one of the conductors is inherently dangerous to operate because of the associated voltage drop along the cable armor (130 volts is not uncommon). Intermittent contact with the casing downhole or parts of the oil rig structure at the surface may cause arcing since the casing and oil rig structure are at a different electrical potential than the cable armor. Further, people coming into electrical contact with different points on the cable armor (perhaps via a truck body or the oil rig) may be subject to an electrical shock because of armor voltage drop. Electrical currents as small as 15 mA through the human body are potentially dangerous.

If all currents are carried by the interior conductors of the cable, electrical risks are greatly reduced because all conductors delivering power are encased inside 2 layers of steel armor wires. Additionally, this configuration allows for a simple, reliable electric fault monitor to be economically implemented to constantly monitor whether indeed all power currents are confined to the cable conductors. When power currents are not completely confined to the cable conductors, the system immediately shuts itself down.

Figure 4A:
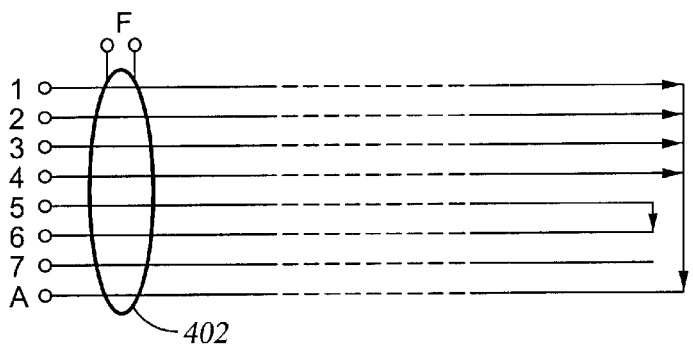
FIGS. 4A and 4B show alternate configurations for electrical fault detectors.

Referring now to FIG. 4a, a fault detector configuration is shown for a logging cable that uses the armor as a power carrier. The protection mechanism is a current detector, e.g. a coil of wire 402 surrounding the cable conductors 1 through 7 and A as shown. Such a coil of wire senses a net AC current flowing through electrical conductors passing through the area enclosed by the sensing coil. If a net AC current passes through the enclosed area, a voltage is generated between the two ends F of the sensing coil wire. Equivalently, the voltage between the ends of the coil is zero when the sum of the currents flowing in the cable conductors is zero. The voltage output of the current detection coil will remain zero indicating no net AC current passing through the enclosed area when power is being passed properly from the surface to the logging tools.

The fault detector configuration of FIG. 4a is unreliable for at least the following reasons. Since the armor is not insulated, current being carried on the armor through the loop has not necessarily remained in the armor for the entire length of the cable. To measure the current on the armor, the wire loop must be positioned around the cable before the cable is wound onto the spool. This positioning requirement raises additional problems including increased likelihood of damage. Also, the magnetic marks on the armor may cause many spurious fault detections.

Figure 4B:
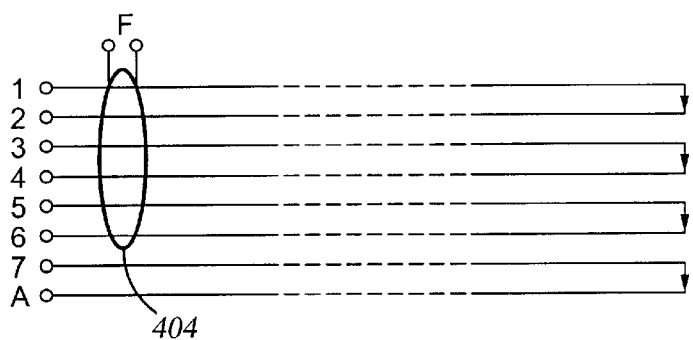

Referring now to FIG. 4b, a fault detector configuration is shown for a logging cable which does not use the armor as a power carrier. One or more loops of wire 404 surrounds conductors 1 through 6 of the logging cable. However, the loop may be placed between the spool 26 and the transceiver 28. This will allow the use of a smaller, more conveniently located, wire loop. Any current imbalance in the power signals is reliably detected, and the presence of small telemetry signal currents on the armor does not pose any shock hazard. It also allows the use of alternative fault detector configurations which can also detect DC current imbalances. One such alternative configuration uses Hall effect sensors such as AMPLOC current sensors as described in an Engineer's Reference Handbook provided by Energy Science Corporation of Goleta, Calif. which is hereby incorporated by reference.

A fault occurs in situations in which the sum of the currents in the six outer conductors do not exactly equal zero. Upon detecting a current imbalance of 15 mA or more, all power supplied to the system is shut down. This threshold may be adjusted based on empirical observations, and in an alternative embodiment, this threshold is set at 50 mA. In this situation current in one or more of the modes is flowing on conductors which do not fall within the set of conductors 1 through 6. Under any detected fault condition, the power to all surface power supplies is immediately shut off. There are two likely faults that may occur during logging operations (a) electrical leakage between one or more conductors to the cable armor, and (b) electrical short circuit between circuitry in one of the downhole tools and the pressure housing. Since the pressure housing is electrically connected to the cable armor, both conditions may result in currents in the cable armor. When one or more of the modes are transporting high power, this situation can result in a large voltage drop along the armor posing a serious hazard to workers. In either case the current detector detects current missing from the 6 cable conductors and automatically shuts down all surface power.

High power transport via balanced mode M6 offers a definitive method for implementing ground fault interrupt protection with a multiconductor cable. A sensor is used to detect any stray current flowing in the armor. Any detected stray current is immediately judged to be an unsafe system fault, and the power to the cable is shut off. The ground fault interrupt system protects against dangerous conductor to armor shorts as well as downhole tool malfunctions which would place lethal currents on the armor.

All electrical power currents are carried through six of the seven conductors, and no electrical power currents are carried on the cable armor. Therefore people handling the cable during (i) deployment of the tools and cable into the borehole, (ii) operation of the tools in the borehole, or (iii) extraction of the cable and tools from the borehole, are not exposed to currents intended to power the tools at the bottom end of the cable. Since all power currents are inside 2 layers of steel armor wire, there is minimal danger of electrical shock from these power currents to people who come in contact with the cable armor. This, in addition to the reliable electrical fault detector, greatly increases the safety of the system. This system is expected to be in demand due to the substantial safety improvements offered in conjunction with the substantially increased power transport capacity.

In addition to minimizing transmission losses, mode M6 increases the maximum amount of power which can be delivered downhole. Since the maximum voltage which can be applied between outer conductors without exceeding the breakdown voltage of the insulation is double the maximum voltage which can be applied between the conductors and the armor, the cable can transport four times as much power, albeit with higher percentage losses. Nevertheless, the gain in transported power substantially exceeds the increased losses.

The following mode assignments are contemplated:

| Mode | Power | Telemetry |
| --- | --- | --- |
| M2 | motors/auxiliary (60 Hz, 400 Hz) | bi-directional utility |
| M3 | secondary instruments (60, 400 Hz) | — |
| M4 | second auxiliary (60 Hz, 400 Hz) | downlink |
| M5 | instruments (60 Hz, 400 Hz) | uni-directional utility |
| M6 | high power applications (DC, AC) | — |
| A7 | — | uplink |

Tools requiring on the order of 1800 watts or more, either AC or DC, may be powered via mode M6 with this system over a 30,000 ft. logging line having 4000 ft at the ambient surface temperature and power currents entirely inside two layers of steel armor. Advantageously, no mode M6 transformer is required at the surface or downhole to apply or extract this power. This is beneficial since high power transformers tend to be bulky, and space is at a premium in downhole tools. Further, the system reliability is increased by the removal of unnecessary transformers. Any of four other independent modes (M2–M5) may be used to supply up to 240 watts of power per channel. Additionally, modes M2, M4, MS, M6 and A7 may be used to transport telemetry information. In one implementation, two of these channels are used to supply information from the surface to the tools and two of the channels are used to supply information from the tools to the surface. The apportionment of independent signal paths between upward traveling and downward traveling information while equal here at two each may be chosen to fit the needs of the user.

In order to get as high a voltage as possible on each mode of power transmission and still not exceed the voltage rating of the logging cable, one or more of the power sources supplying power simultaneously to the cable may be shifted in phase with respect to the high power supply. Thus the peak voltages of different power sources no longer occur simultaneously. In this manner phase shifting of one source with respect to another allows the highest possible voltages to be run on each power mode.

Additionally, pure sinusoids may leave too much time in which the maximum voltages are not being applied to drive power down the conductors. One way to increase the power throughput is to customize the waveforms to "flatten" and "fatten" the sinusoidal peaks, thereby increasing the amount of time during which a substantially maximum voltage is applied. Extreme modification may introduce too many harmonics which could interfere with telemetry on the same mode, so it is desirable to keep the harmonic content to a minimum.

Figure 7:
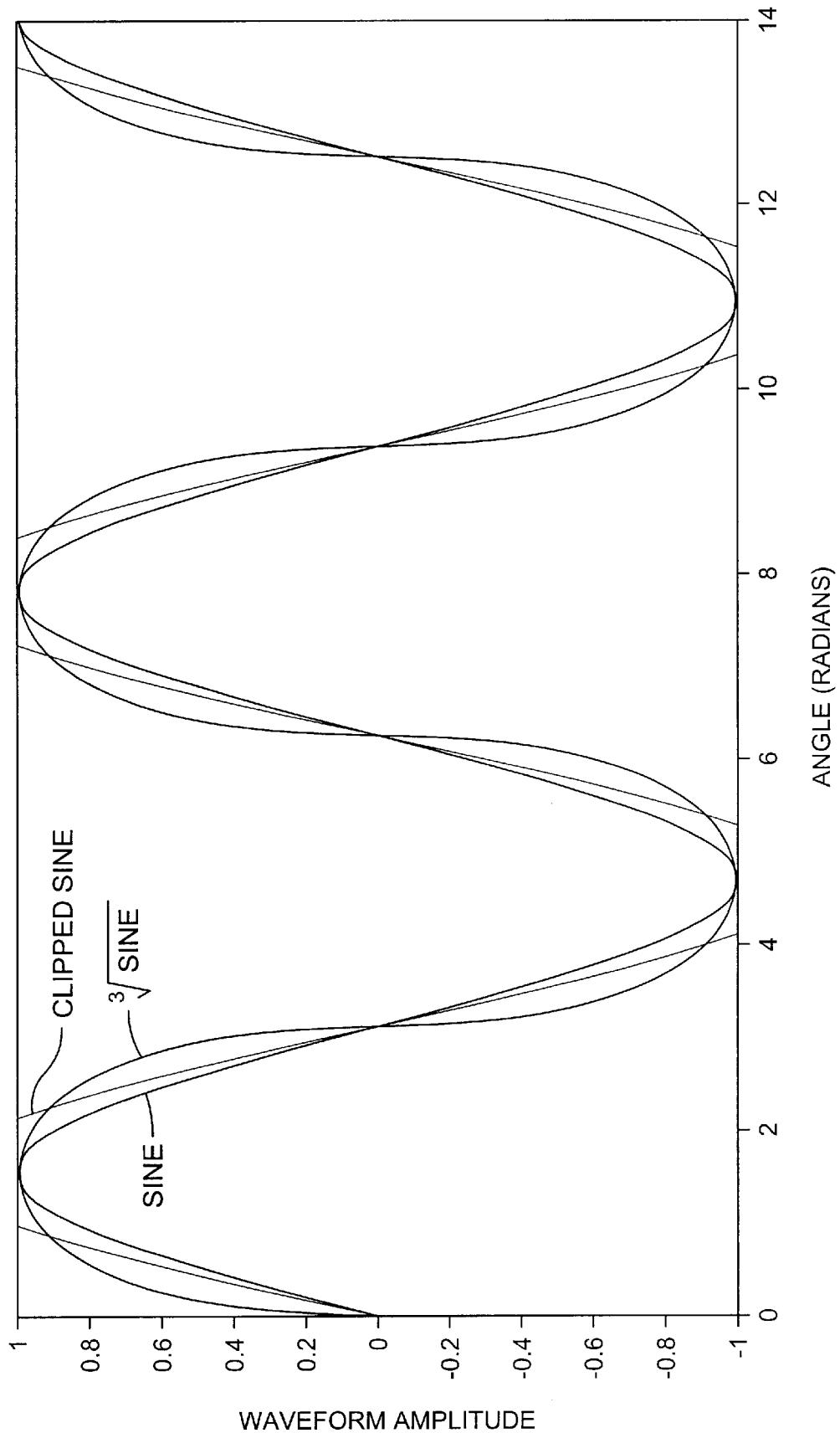
FIG. 7 is a graph of various signal waveforms.

FIG. 7 shows a sine waveform for comparison with a clipped sine waveform and a cube-root sine waveform. These modified waveforms may be beneficial for increasing the power capacity of the logging cable by increasing the amount of time during which a substantially maximum voltage is carried by the cable without creating substantial high-frequency harmonics.

Power is maximized by delivering a maximum vector sum voltage of the several power mode voltages at all times. Each of the mode power waveforms may be shaped so that the vector sum is maximized at the maximum allowed logging cable voltage at all times. Arbitrary waveform generators for each of the power supplies would allow such shaping.

Computer control may be used to optimize performance of the system. Computer 30 can be programmed with the toolstring configuration, and can be configured to determine the communications protocols and resulting power requirements of each mode. The computer may further customize waveforms and phase shifts of the individual power sources to maximize the power capacity of the cable 20. The individual power sources may be switching power supplies with programmable amplitudes, phase shifts, and waveforms that the computer can control. The power sources 32 may be provided with RS232 ports for bi-directional communication with computer 30. In a preferred embodiment, the computer 30 analyzes uplink telemetry to determine power voltages downhole and automatically adjusts the power supply parameters to stabilize the downhole power voltages. The computer may also be configured to monitor the power fault detector and to shut down the power sources upon determining the presence of a fault.

In one contemplated embodiment, surface tool power supplies include up to four 1 kilowatt switching DC to DC supplies, two 1.2 KVA phase shifted variable frequency switching AC supplies, and one 6 KVA switching power supply. All supplies may be controlled with RS232, IEEE 488, Ethernet, or CAN communication buses from the main surface computer. Alternatively, the control may be provided from a remotely-sited computer sending commands via satellite link, cellular telephone (wireless communications link), or via the Internet. Particular logging services can then be loaded into computer memory. Calibration files, setting up the tool power supplies for a specific tool string and controlling power to the tools in real time are all under computer control. Job reliability and speed are greatly improved.

Depending on the toolstring configuration, more than one uplink telemetry channel may be desired. For example, the telemetry sample rate for downhole voltages might be as slow as once every 100 ms. If feedback control of downhole voltages is desired, a dedicated channel for voltage telemetry may be necessary. A voltage controlled oscillator may act as a voltage sensor downhole, and may transmit a frequency signal indicative of the power voltage via mode M5 to the surface. In an alternate embodiment, the voltage sensor may transmit digitally encoded signals to the surface.

In an alternate embodiment, the surface voltage can be momentarily altered and the resulting current change used to determine line resistance. This line resistance value can be used with the measured current to calculate voltage loss on the cable. This loss can then be compensated for using a computer controlled supply. This can be used to advantage to keep a capacitor downhole charged so that the voltage varies over a narrow range. The capacitor is discharging at arbitrary rates depending on the needs of surveys that require pulsed transmitters extracting energy from this capacitor.

For increased versatility, time division multiplexing may also be used on the modes. Motors which do not need to be run simultaneously can trade off "ownership" of a power mode. For example logging tools run in a stationary position can switch off and allow other tools to run as the tool goes up or down the borehole. The switching may be controlled via commands transmitted with the downlink telemetry. The computer can be configured to handle this control function.

Figure 5:
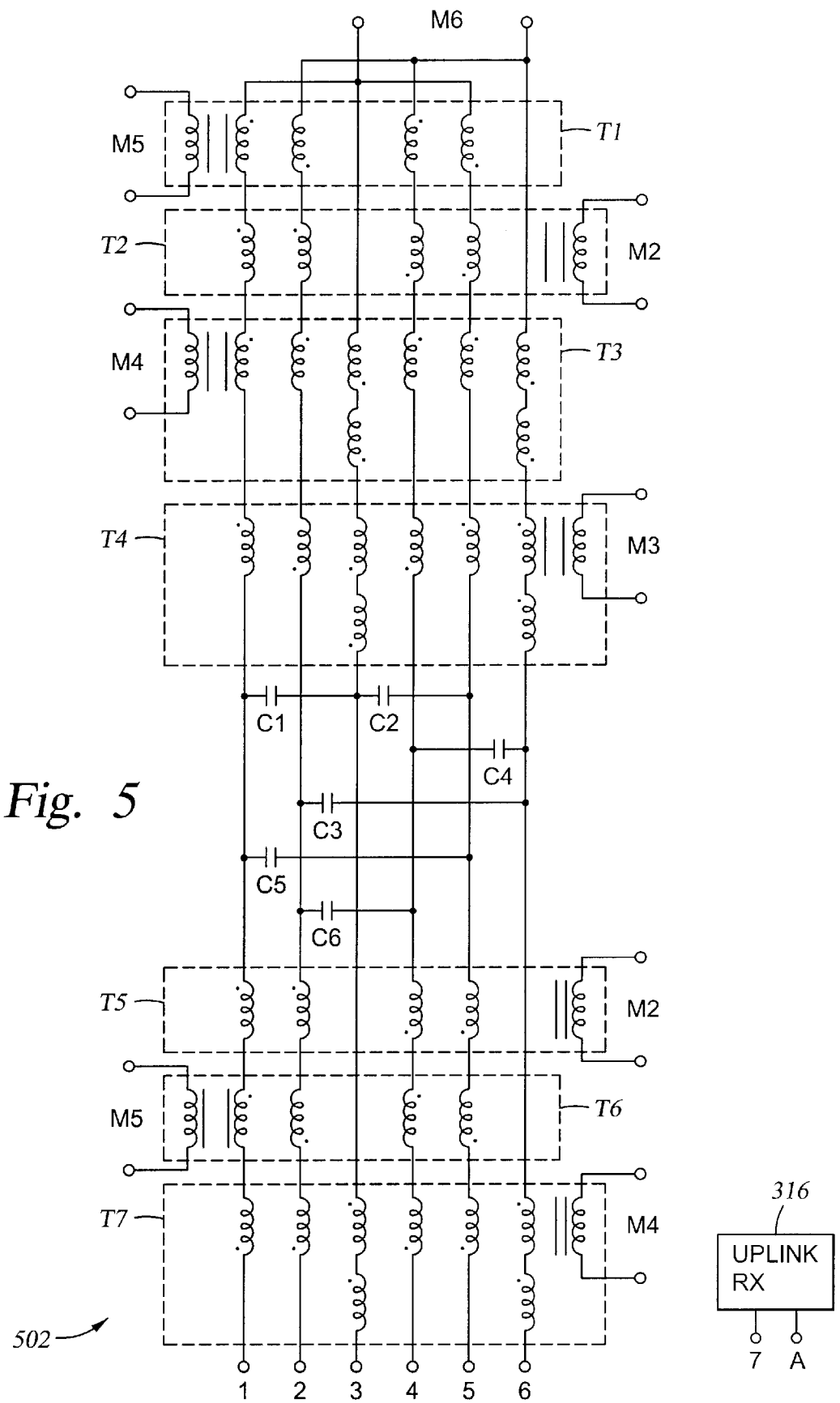
FIG. 5 is a schematic diagram of a power and telemetry mode transformer configuration in one embodiment of the surface equipment.

Referring now to FIG. 5, a schematic of the mode transformers for a preferred embodiment of the surface equipment 502 is shown. Surface equipment 502 includes mode transformers T1 through T7, capacitors C1 through C6, and uplink receiver 316. Uplink receiver 316 is coupled to conductors 7 and A (Armor) to receive information sent from the tool to the surface. In one embodiment, uplink receiver 316 has a 50 ohm input impedance.

Power is supplied to terminals M6 for transport downhole via mode M6. Mode M6 offers the lowest cable impedance of the modes which keep all the power conductors contained within the armor. To activate mode M6, conductors 1, 3, and 5 are placed at one polarity while the three remaining conductors 2, 4, and 6, must be placed at the opposite polarity. Since this is done by direct connection as opposed to transformer coupling, the mode M6 voltage may be either AC or DC. In this embodiment, these two sets of conductors are handled in separate but identical current loops at the surface; i.e. the size and number of wire coils in each conductor path is designed to provide equal impedances on each conductor.

If the power provided to mode M6 at the surface is 1300 volts at 3 amps, due to transmission losses the available downhole voltage is expected to be 650 volts at 3 amps. If the cable were exactly matched to the load, ½ the surface power would be dissipated in the cable and the remainder could be passed to the load downhole.

Power is supplied to the primary of multifilar transformer T1 for transport downhole via mode M5. A first center-tapped winding places a potential between cable conductors 1 and 5 while a second, identical center-tapped winding places an equal but opposite potential between cable conductors 2 and 4. This is exactly the requirement to activate mode M5. This potential may be limited to 480 VAC maximum. In a preferred embodiment, transformer T1 has two 250 VAC primary windings which can be configured in series or parallel. If the power source is 500 VAC maximum, these two transformer primary windings may be connected in series across the source. If the AC power source is 250 VAC maximum, then the two primaries of transformer T1 may be tied in parallel across the AC power source. In one specific embodiment, transformer T1 is a model 1535 transformer from Houston Transformer.

Power is supplied to the primary of multifilar transformer T2 for transport downhole via mode M2. Transformer T2 is provided with four identical windings. Two of these act to place a potential between conductors 1 and 5, while the other two windings place an identical potential between conductors 2 and 4. The windings are polarized such that these potentials have the same sign. As with transformer Ti, the primary may be excited with 250 volts AC or 500 VAC. In one specific embodiment, transformer Ti is a model 1535 transformer from Houston Transformer.

Power is supplied to the primary of multifilar transformer T3 for transport downhole via the mode M4. This transformer preferably has 8 identical 240 volt windings. Each of the six outer cable conductors has either one or two windings of this transformer inserted in series with the conductor. Conductors 1, 2, 4, and 5 have identical single windings polarized identically placed in series with each conductor. Two identical windings connected in series and polarized in the opposite direction are placed in series with conductors 3 and 6. The current paths through transformer T3 are closed via transformers T1 and T2. At the downhole end of the cable, other transformers will close the other side of the current loop. Without these terminations, power transfer is inhibited since currents cannot be excited in the transformers. The voltages induced in transformer T3 are exactly the voltages necessary to excite mode M4. In one specific embodiment, transformer T3 is implemented as two separate four-filar transformers T3 a and T3b, both of model type 1535 from Houston Transformer. The primaries of the transformers are coupled in parallel across the mode M4 source. The secondaries of transformer T3 a are coupled in series with conductors 1, 3, 5 and the secondaries of transformer T3b are coupled in series with conductors 2, 4, 6. Conductors 3 and 6 each have two secondaries coupled in series to provide a double weight.

Power supplied to the primary of multifilar transformer T4 for transport downhole via the M3 mode. Mode M3 is similar to mode M4 in that it requires conductors 3 and 6 to be excited with double-weight voltages. This is accomplished in the same way as described with mode M4, i.e. inserting two identical windings (this time of transformer T4) in series with conductors 3 and 6. Single identical windings of the same multifilar transformer T4 have been inserted in series with conductors 1, 2, 4, and 5. The winding polarities are chosen to activate mode M3.

It is desirable that these identically generated voltages with single- or double-weights at the surface cause currents to flow through conductors that are as closely matched as possible. Thus the outer six conductors of the logging cable should have a high degree of balance with respect to series resistance and capacitance to armor. Any imbalances will cause crosstalk between the modes.

Transformers T1, T2, T3, T4 together make up the power source coupling to the logging cable. Transformers T5, T6, T7 together with uplink receiver 502, make up the telemetry coupling to the logging cable. It is empirically noted that the series inductance of the windings of the power transformers causes them to appear as open circuits at telemetry signal frequencies. Capacitors are one means to provide closed current paths for the telemetry transformers. Capacitors C1, C2, C3, C4, C5 and C6 are placed between the power source coupling and the telemetry coupling to close the high frequency current paths for modes M2, M4, M5. Conductor 3 is coupled to conductors 1 and 5 by capacitors C1 and C2, respectively. Similarly conductor 6 is coupled to conductors 2 and 4 by capacitors C3 and C4, respectively. Capacitors C1 through C4 close the current paths for M4 telemetry. Conductors 1 and 5 are coupled by capacitor C5, and Conductors 2 and 4 are coupled by capacitor C6. Capacitors C5 and C6 close the current paths for M2 and M5 telemetry. Capacitors C1 through C6 are preferably 0.2 $\mu$F.

Transformer T5 and a matching transformer downhole transmit and receive telemetry information via mode M2. Similarly transformer T6 and a matching transformer downhole transmit and receive telemetry information via mode M5. These transformers each have four identical secondary windings preferably consisting of 13 turns of quadrabuild polyamide magnet wires. Each of the cable conductors #1, #2, #4, and #5 has one transformer winding in series with the conductor and polarized as shown in FIG. 5. The polarity configuration determines which modes are activated. In a preferred embodiment, each transformer is wound on a A400 ferrite pot core. The ferrite cores each have an air gap approximately 0.002" thick between two faces of the core. A transformer core with an air gap has the advantageous feature that 60 Hz currents going through the transformer on the same mode do not saturate the core. The low number of turns and the gapped core provide a poor frequency response at 60 Hz. Poor response at 60 Hz is desirable and reduce the large power components at low frequencies from disrupting telemetry signals transported on the same mode. This provides sufficient isolation for telemetry signals in the frequency range from 10 Khz to 200 Khz or more. The telemetry signals can travel from downhole to the surface or from the surface to downhole using the surface and downhole transformer pair. The primaries of transformers T5, T6, and their downhole counterparts may preferably be 1×26 turns or 2×26 turns depending on whether a single ended or a balanced input/output is desired. Other turns ratios may also be employed.

Down link telemetry is provided to the primary of transformer T7 for transport downhole via mode M4. In a preferred embodiment, this transformer is wound on a EC70 "C" type ferrite core of 3C8 material with 8 windings of 40 turns each wound in multifilar fashion. The single primary has 190 turns. Since this embodiment does not have a poor frequency response to 60 Hz, the primary of this transformer is shorted out when 60 Hz power is supplied to mode M4 through transformer T3. Downlink telemetry on this channel thus operates only when power is not being supplied. One of skill in the art will recognize that transformer T7 can alternatively be designed with a poor 60 Hz response to enable simultaneous use of mode M4 for telemetry and power transport.

Up link telemetry is provided from a downhole telemetry modem via central cable conductor 7 and the cable armor A. Since the central conductor couples equally to each of the outer six conductors, the central conductor can be treated separately from the outer 6 conductors. Signals imposed between the central conductor and the armor couple to the outer 6 conductors and travel in concert down the central conductor and the outer six conductors. Although this A7 propagation pattern is independent of modes M2–M6, it will interfere with any mode M1 signals. The tight capacitive coupling between the armor and the six outer conductors results in the outer six conductors being driven slightly positive in concert with each other when the armor is driven negative with respect to the central conductor. Frequency response measurements show that the outer six conductors together with the central conductor act somewhat like a "leaky" coaxial cable. Nevertheless, a high bandwidth independent channel is available using the A7 configuration.

As previously mentioned, a method to protect people working with or near the cable has been incorporated in the power delivery system. It operates on the same principal as the familiar ground fault interrupter used in household electrical circuits.

Each of the 5 independent methods of delivering power with the above described system is balanced. Specifically, current to deliver power via any of the modes M2–M6 goes down certain conductors in the set of conductors 1 through 6, and returns on other conductors in the set. None of the tool powers use mode M1 or use the armor as a conductor. None of the current to deliver any of the mode power travels on any conductor other than the six outer conductors of the logging cable. This fact may be used to advantage to protect people working in contact with the logging cable.

Figure 6:
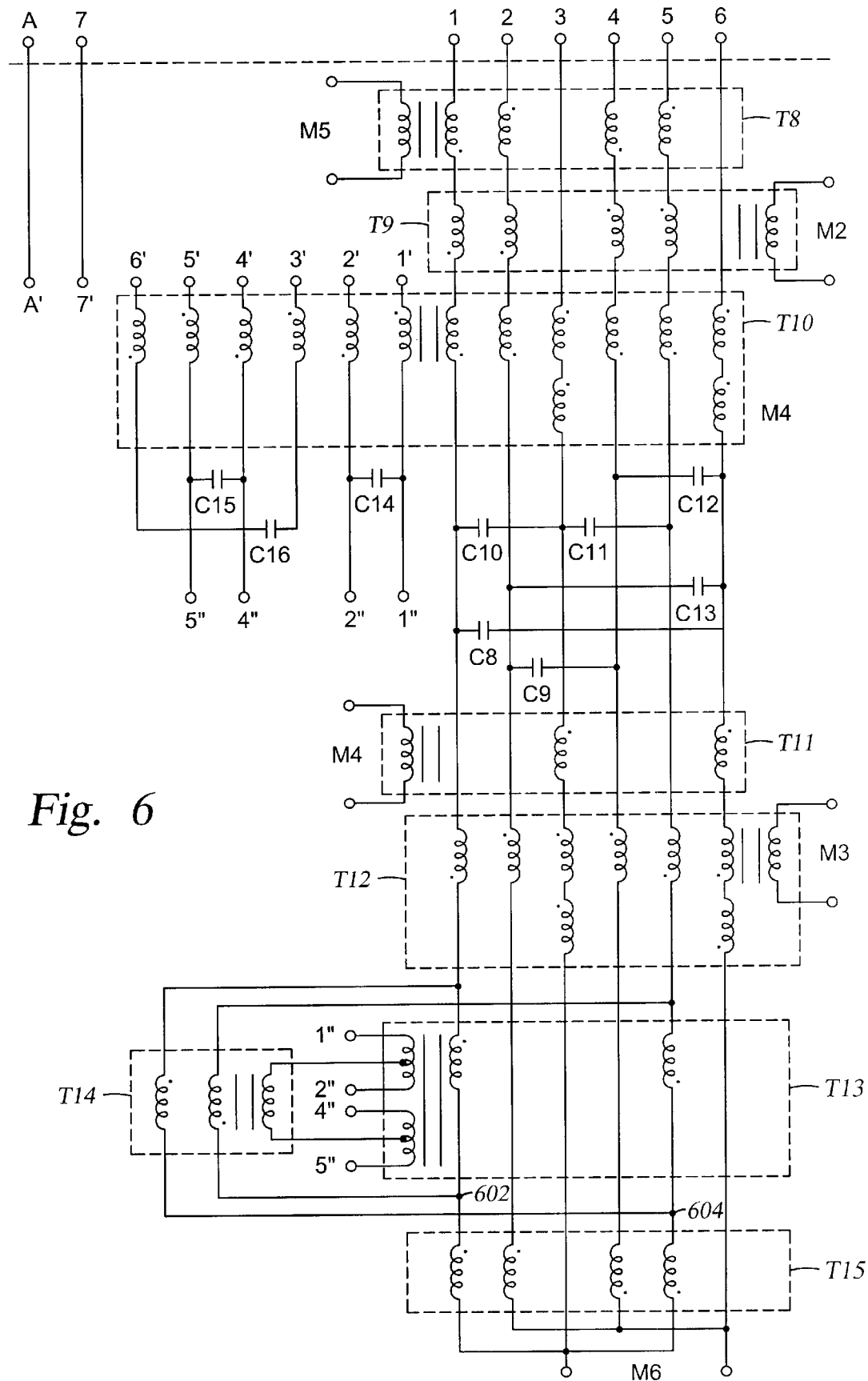
FIG. 6 is a schematic diagram of a power and telemetry mode transformer configuration in one embodiment of the downhole equipment.

Referring now to FIG. 6, a schematic of the mode transformers for a preferred embodiment of the downhole equipment is shown. The mode transformers couple to the cable to extract the power for the tools and to provide telemetry signal communication with the surface. Both of these functions are enclosed in a tool mounted at the top of the tool string just beneath the cable head. This section is herein called the Power/Telemetry Management Sub (PTMS). The PTMS of FIG. 6 is configured to interface with existing downhole equipment that expects power on modes M2 and M5, downlink telemetry on mode M6, and an uplink telemetry path via A7. The PTMS supports existing downhole equipment coupled to conductors 1' through A' by extracting mode M2 and M5 power from conductors 1 through 6 and re-transmitting it as mode M2 and M5 power on conductors 1' through 6'. Downlink telemetry from mode M4 on conductors 1 through 6 is re-transmitted as mode M6 telemetry on conductors 1' through 6'.

In addition to supporting the existing downhole equipment, the PTMS of FIG. 6 provides connections to two additional telemetry channels via modes M2 and M5 of conductors 1 through 6, connections to two additional power channels via modes M3 and M4 of conductors 1 through 6, and connections to a high power channel via mode M6 of conductors 1 through 6.

Transformers T8, T9, T10, together with uplink modem 314 (part of existing downhole equipment shown in FIG. 3) provide the telemetry signal communications. Transformers T11, T12, T13, T14, and T15 perform the power extraction from the cable. Uplink modem 314 is connected to central cable conductor terminal 7' and the cable armor terminal A' to transmit uplink telemetry via mode A7.

Telemetry from modes M5 and M2 is coupled to the primaries on transformers T8 and T9, respectively. These are the matching transformers for transformers T6 and T5, and may be constructed in the same manner as T6 and T5. This construction, as described above, provides for a poor frequency response at 60 Hz to prevent the power signals from interfering with the telemetry signals.

Downlink telemetry from mode M4 is extracted by the secondary windings of transformer T10. The downlink telemetry is then provided by primary windings of transformer T10 in the form of mode M6 telemetry signals on conductors 1'–6'. Since existing equipment is configured to receive mode M6 downlink telemetry signals, it may be preferable to convert from mode M4 to M6 rather than make modifications to the existing equipment. Capacitors C14, C15, C16 are coupled between windings of opposing polarities to provide closed current paths in the transformer T10 primaries. In a preferred embodiment, these capacitors are 0.2 $\mu$F. Other methods may be used to excite a mode M6 signal on conductors 1'–6'. For example, an even number of windings less than 6 may be used to excite a signal on a subset of the conductors 1'–6'. For example, a pair of capacitively coupled windings could excite a potential between conductors 1' and 2', and a second pair of capacitively coupled windings could excite an opposing potential between conductors 4' and 5'. This pattern would be picked up by a mode M6 transformer.

Transformer T10 is preferably wound on a high temperature core material, such as Ferroxcube 3C8 type 4229 pot core. Contained in the same transformer are six separate filar windings of 16 turns each. The signals received on the eight filar windings excite equal currents in the six filar windings. In an alternate embodiment, four filar windings are used. Four identical windings are sufficient to excite the proper voltages in the normal telemetry receiving equipment, and the omitted windings should result in a cost savings. Transformer T10 may also include an additional single winding that is connected to a small inductor (not shown). In one embodiment, this small inductor has 18 turns on a small core so that it has a low resistance and a low inductance at low frequencies. Connecting this low resistance, low inductance device to one of the windings effectively eliminates low frequency amplitude distortion in the telemetry signal due to DC variations in the telemetry signal. Transformer T10 includes a gapped core to reduce its response to 60 Hz power sent via mode M4.

Conductor 3 is coupled to conductors 1 and 5 by capacitors C10 and C11, respectively, and conductor 6 is coupled to conductors 2 and 4 by capacitors C13 and C12, in similar fashion to the surface capacitor configuration. These capacitors are preferably 0.2 $\mu$F, and they operate to close the current paths for the high frequency mode M4 telemetry signals through transformers T8, T9, and T10. Conductors 1 and 5 are further coupled by capacitor C8, and conductors 2 and 4 are further coupled by capacitor C9. C8 and C9 are preferably 0.2 $\mu$F, and they operate to close the current paths for the high frequency mode M2 and M5 telemetry signals through transformers T8, T9, and T10.

Power from mode M4 is provided on the primary of transformer T11. Transformer T11 is preferably a model 1362B transformer from Houston Transformer. This transformer places 240 V windings in series with conductors 3 and 6. The windings for conductors 1, 2, 4 and 5 can be omitted since the current in the omitted windings also flows through the windings for conductors 3 and 6, and the omitted windings are not necessary for ensuring orthogonality with modes M2, M3, M5 and M6. Some reduction in size may be realized by omitting the extra windings.

Power from mode M3 is provided on the primary of transformer T12. Transformer T12 may be implemented as two identical smaller transformers T12*a* and T12*b* with their primaries coupled in parallel. The secondaries of T12*a* would be placed in series with conductors 1, 3, 5, and the secondaries of T12*b* would be placed in series with conductors 2, 4, 6. In one embodiment, the two identical transformers T12a and T12b are model 1362B transformers from Houston Transformer. Conductors 3 and 6 each have two primary windings in series. This provides double weights to the currents in conductors 3 and 6 as required for mode M3.

Transformers T13 and T14 are configured to extract power from modes M5 and M2 and to route this power around termination transformer T15. Power from modes M2 and M5 is supplied to the existing equipment on conductors 1', 2', 4' and 5' (Outputs 1", 2", 4", 5" of transformer T13 connect to conductors 1', 2', 4', 5' as shown in FIG. 6). The conductors coming up from the existing equipment that normally connect to the multiconductor cable are referred to as 1' through A'. The primes are provided to distinguish these conductors from the cable conductors 1 through A. The PTMS advantageously isolates these conductors from the high power channel on conductors 1 through 6.

Transformer T13 has one winding connected between conductor 1 and node 602, and the other winding connected between conductor 5 and node 604. Mode M5 power is converted from 240 volts AC on the primaries of this 2:1 transformer to 120 volts AC on the two secondary windings. (It is noted that using 240 volts AC downhole matches the impedance of the cable far more closely than using 120 volts AC and therefore increases the delivery of power while still allowing the tool instruments to remain at 120 volts AC for ease of lab bench troubleshooting or repair.) This power is delivered on conductors 1", 2", 4", and 5" as mode M5 power to the tool string. In a preferred embodiment, transformer T13 is a model 1362B transformer from Houston Transformer.

Transformer T14 has one winding connected between conductor 1 and node 604 and the other winding between conductor 5 and node 602. This transformer responds only to mode M2. Thus up to 240 volts AC at 1 amp of mode M2 power may be taken from the secondary of transformer T14. By connecting the secondary of T14 to the center taps of transformer T13 secondaries, mode M2 power is as a common mode voltage on conductors 1" and 2" vs. 4" and 5". Thus mode M2 power is delivered over these conductors as mode M2 power to the tool string. In a preferred embodiment, transformer T14 is a model 1362B transformer from Houston Transformer.

Transformer T15 is a termination transformer (preferably a model 1527A transformer from Houston Transformer) which terminates the current paths for all the current modes except mode M6, and which is used to extract power from mode M6. Since T15 is a 1:1 transformer any voltage that appears across the primary (between conductors 2 and 4 ) is available at the secondary (between conductors 1 and 5 ). Modes MS and M2 both have a difference in polarity between conductors 2 and 4. This same difference in polarity shows up at nodes 602 and 604 for modes M2 and M5. On the other hand, mode M6 drives conductors 1, 3, and 5 at one polarity, while conductors 2, 4, and 6 are driven at the other polarity. Conductors 1 and 5 connect via transformer T15 to conductor 3. Since for mode M6, conductors 1 and 5 are at the same voltage, the same mode M6 voltage exists at all points across the corresponding windings of transformer T15, and the common mode M6 voltage is available at the terminal on conductor 3. Conductors 2 and 4 similarly connect via transformer T15 to conductor 6. The mode M6 load is then connected between the terminals on conductors 3 and 6. Thus modes M2 and MS are transferred across this transformer while mode M6 is stripped away and passed to its load. In one embodiment 600 volts AC or DC at up to 3 amps (1800 watts) from mode M6 is available between the terminals for mode M6. Even though each winding of transformer T15 must carry mode M6 current (and hence the wiring must be able to handle heavy currents), there is no transfer of mode M6 power via the transformer core (so that a bulky high-power core is unnecessary).

Figure 8:
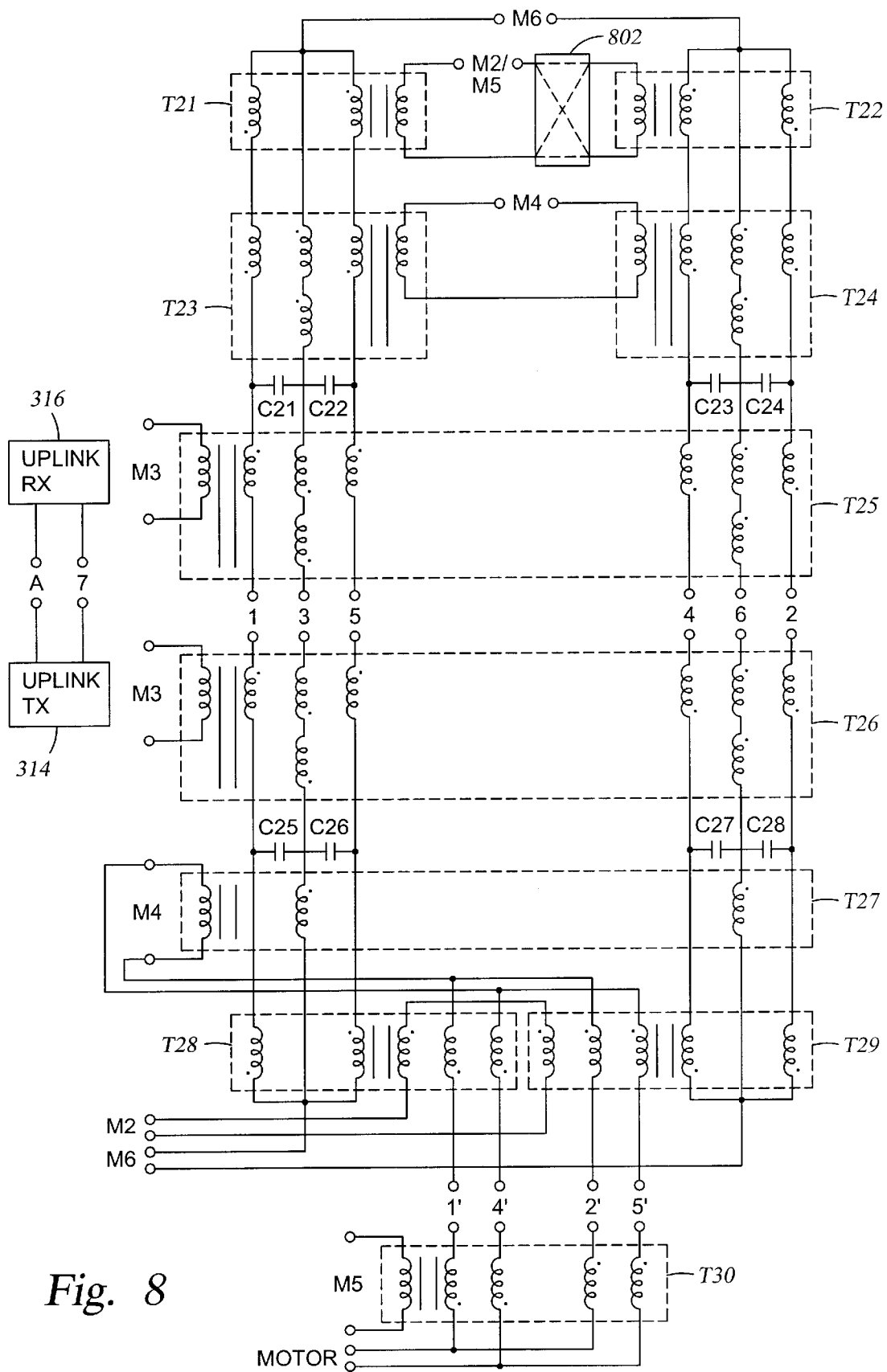
FIG. 8 is a schematic diagram of a power and telemetry mode transformer configuration in a second embodiment of the high power system.

FIG. 8 shows a schematic circuit for a second embodiment of the mode transformer system. The system may include a switch 802 or other mechanism for switching the system between two states. In one state, the switch 802 is set in a "pass" mode so that the M2/M5 power supply excites mode M2 power on conductors 1–6. In the second state, the switch 802 is set in an "invert" mode so that the M2/M5 power supply excites mode M5 power on conductors 1–6. The switch 802 may be omitted and the switching effect may preferably be achieved by swapping cable conductors 2 and 4 between the connecting terminals on the surface. The switch is shown primarily for explanatory purposes.

The configuration shown advantageously excludes power from being simultaneously present in both modes M2 and M5. Mode M2 may illustratively be used to power one set of downhole instruments, while mode M5 is reserved for a separate set of downhole tools that might in some way interfere with the first set of downhole instruments, or vice versa. One such configuration includes a releasable cable head that is designed to separate the sonde from the wireline upon command. Since the design prevents mode M2 and M5 from being powered concurrently, a "lockout" relay is unnecessary downhole. Specifically, instrumentation running on mode M2 power does not have to actively prevent a releasable cable head tool running on mode M5 power from operating.

Mode transformers T21, T22, T23 and T24 may be identical multifilar transformers with one primary and four secondary windings. In transformers T21 and T22, two secondary windings may be connected in series to make up each of the two secondaries shown in FIG. 8. The power supply for mode M2 or alternatively M5 may be coupled to the primaries of T21 and T22, with the primaries either in series or parallel. The power supply used to generate voltages that activate mode M4 may be similarly coupled to the primaries of transformers T23 and T24. Mode transformers T21, T22, T23 and T24 may be torroidal, and may more specifically be Amveco type No. 27265. Rather than using a single transformer for each mode, two transformers are used for generating each of the modes M2/M5 and M4. The splitting of the mode transformers reduces the demands made on the transformer winding insulation. If a single transformer were used for each mode when mode M6 is used to carry high power, that single transformer insulation would have to withstand between its windings the 1300 VAC that is supplied between the conductor set 1, 3, 5 vs. conductor set 4, 6, 2, plus the 900 volts that the two mode transformers in series generate. As 2 transformers, the insulation voltage is 900 volts between windings and 650 volts between any winding and the equipment chassis.

In the first state, transformers T21 and T22 combine to provide power to the primary windings of downhole transformers T28 and T29. Two of these windings will add, allowing 240 volts of instrumentation power to be delivered to the downhole mode M2 terminals. Voltages in the remaining primaries of T28 will be canceled by corresponding voltages in the secondaries of T29. In the second state, the situation is reversed, with the voltage at the downhole mode M2 terminals being zero, and the voltages in the remaining primaries of T28 and T29 adding. This causes mode M5 power from the cable conductors 1–6 to be converted to mode MS power on cable conductors 1', 2', 4' and 5'. These conductors are coupled to a downhole tool having a mode transformer T30 configured to receive power provided via mode M5.

Mode transformers T28 and T29 may be identical Houston Transformer R-1387 transformers each having three primaries. The rightmost two primaries shown in FIG. 8 may preferably be 60 volts and the leftmost primary may be 120 volts. Connection is such that 120 V secondaries oppose each other while 60 V secondaries add with their corresponding secondary on the other transformer. Thus, depending on the phase relationship between voltages applied to the secondaries of transformers T28 and T29, either mode M2 or mode M5 output voltages are generated. However, mode M2 and M5 output voltages are not generated concurrently provided the phase of the input voltage is either 0 degrees or 180 degrees.

Transformer T27 may be a Houston Transformer R01386 is used to extract power from mode M4 downhole. The mode M4 power may be provided as mode M2 power to a downhole motor via conductors 1', 2', 4' and 5'.

Transformers T25 and T26 may be used to transmit and receive, respectively, downlink telemetry via mode M3. They are preferably capacitively isolated from the power transformers by capacitors C21–C24 and C25–C28, respectively. Capacitors C21–C24 may be approximately 1 microfarad, and capacitors C25–28 may be approximately 0.3 microfarad.

Numerous variations and modifications will become apparent to those skilled in the art once the above disclosure is fully appreciated. It is intended that the following claims be interpreted to embrace all such variations and modifications.

What is claimed is:

1. A system for high-power well logging, wherein the system comprises:
    a multiconductor logging cable which supports a plurality of orthogonal signal transmission modes on circumferentially spaced conductors enclosed within armor and electrically insulated from said armor; and
    surface equipment which includes a high-power power source coupled to the multiconductor cable to drive a power signal in a lowest impedance mode from said plurality of orthogonal signal transmission modes, wherein in the lowest impedance mode the power signal is driven in alternate polarities on adjacent ones of the circumferentially spaced conductors.

2. The system of claim 1, wherein the surface equipment further comprises:
    a current imbalance detector configured to shut down the high-power power source when currents in the circumferentially spaced conductors add to a magnitude which exceeds a predetermined threshold.

3. The system of claim 1, wherein the surface equipment further comprises additional power supplies coupled to the multiconductor cable to drive corresponding power signals in corresponding modes from said plurality of orthogonal signal transmission modes, wherein said corresponding modes are different from the lowest impedance mode.

4. The system of claim 3, wherein the surface equipment further comprises a downlink telemetry signal source coupled to the multiconductor cable to transmit a telemetry signal on one of said corresponding modes different from the lowest impedance mode.

5. The system of claim 1, wherein the high-power power source provides at least 4000 watts to the circumferentially spaced conductors for delivery downhole.

6. A method for providing a power signal over a multiconductor logging cable having a maximum voltage rating, wherein the method comprises:
    applying first and second power voltages to alternate circumferentially spaced conductors protected within cable armor, wherein the first and second power voltages have equal magnitudes and opposite polarities;
    coupling the conductors carrying the first power voltage to a first shared downhole terminal; and
    coupling the conductors carrying the second power voltage to a second shared downhole terminal.

7. The method of claim 6, wherein the first and second power voltages have a peak magnitude that is greater than half the maximum voltage rating.

8. A system which comprises:
    an armored multiconductor cable which includes
        a plurality of electrical conductors;
        an electrically conductive armor enclosing the plurality of electrical conductors and separated from the plurality of electrical conductors by electrical insulation;
    a power supply coupled to the plurality of electrical conductors at a first end of the armored multiconductor cable, and configurable to provide power up to predetermined current and voltage limits;
    a telemetry receiver coupled to the first end of the armored cable and configurable to receive a telemetry signal;
    a logging tool coupled to the plurality of conductors at a second end of the armored cable opposite the first end, and configured to receive said power from the power supply;
    a telemetry transmitter coupled to the second end of the cable and configured to provide the telemetry signal; and
    a current imbalance detector coupled to the plurality of electrical conductors at the first end of the cable and configured to shut down the power supply if a net current carried by the plurality of electrical conductors exceeds a predetermined thresholds.

9. The system of claim 8, wherein the predetermined threshold is 50 mA.

10. The system of claim 8, wherein the predetermined voltage limit is twice a rated breakdown voltage of said electrical insulation.

* * * * *